(12) United States Patent
Padera

(10) Patent No.: US 6,718,760 B1
(45) Date of Patent: Apr. 13, 2004

(54) AUTOKINETIC POWER STATION

(76) Inventor: Josef Padera, Kirchstrasse 18, A-6971 Hard (AT)

( * ) Notice: Subject to any disclaimer, the term of this patent is extended or adjusted under 35 U.S.C. 154(b) by 0 days.

(21) Appl. No.: 09/890,615

(22) PCT Filed: Feb. 7, 2000

(86) PCT No.: PCT/IB00/00125

§ 371 (c)(1),
(2), (4) Date: Sep. 17, 2001

(87) PCT Pub. No.: WO00/46501

PCT Pub. Date: Aug. 10, 2000

(30) Foreign Application Priority Data

Feb. 5, 1999 (DE) .......................... 199 04 741

(51) Int. Cl.[7] .............................................. F16D 31/02
(52) U.S. Cl. ........................... 60/398; 60/413; 417/229
(58) Field of Search ................... 60/398, 413, 418; 92/92, 91, 90, 89; 417/229, 903

(56) References Cited

U.S. PATENT DOCUMENTS 4,212,598 A * 7/1980 Roche et al. ............... 417/229
4,339,920 A * 7/1982 Le Van ....................... 417/229
4,409,489 A   10/1983 Hayes
4,418,542 A   12/1983 Ferrell
5,355,674 A * 10/1994 Rosenberg ................... 60/398

FOREIGN PATENT DOCUMENTS

DE   42 25 578   2/1994
DE   43 27 477   2/1995

* cited by examiner

Primary Examiner—Edward K. Look
Assistant Examiner—Michael Leslie
(74) Attorney, Agent, or Firm—Smith-Hill and Bedell (57) ABSTRACT

The invention relates to a device for generating electric energy from the kinetic energy of vehicles. Said device comprises at least one pressure reservoir (13) for a fluid. Said pressure reservoir is arranged in the pavement and has at least one pressure chamber that is compressible in a substantially rectangular direction to the pavement, at least one circuit for the fluid, a component of the fluid circuit representing the pressure chamber, and at least one turbine/generator system (86) arranged in the fluid circuit for generating electric energy from the flow of the fluid.

10 Claims, 7 Drawing Sheets

AUTOKINETIC POWER STATION

Electrical Energy from the Highway!

In this day and age we use many sources for generating electrical energy. But there are very few sources that do not have an adverse impact on the ecology of our environment. For example: Wind sources. The countryside is covered with countless electricity-generating windmills or solar collectors. Not necessarily a pretty sight. Likewise, hydroelectric power stations have a huge impact on the environment. And expanding the number of NUCLEAR AND COAL-FIRED POWER STATIONS has the greatest impact of all.

Global energy consumption is increasing. Taking 1994 consumption as a baseline, the International Energy Agency (IEA) estimates that by year 2010 energy consumption in the industrialized countries will increase by 50%. The emission of pollutants will also increase over the same period. I believe that the solution is to make the greatest possible use of non-traditional sources of electrical energy.

The solution that I am proposing here relates to the use of existing roads and highways, which are always filled with automobiles and represent an untapped energy source.

FIRST THE ADVANTAGES a) no damage to the existing natural environment;

b) no contamination of the environment, surface water, or groundwater;

c) no physical or chemical pollution resulting from chemical wastes such as uranium or carbon dioxide.

Another advantage is the use of automotive transportation and its contribution to a new environmental process. I believe this area has a great potential.

LIST OF THE ADVANTAGES OF THE AUTOKINETIC POWER STATION—AKPS

1) The environment is not threatened by chemical emissions.

2) The location of this system means that it does not harm the surrounding countryside.

3) Its energy helps us, without the need for a long process.

4) It leads to greater highway safety.

5) Based on its principle, it utilizes a new source of energy.

6) The AKPS is economical.

7) It has a simple design.

8) It can be installed in city centers, on overpasses over roads and railroad tracks, and on streets and roads having steep downhill grades.

9) The AKPS uses each vehicle four times.

10) The economical and environmental principle of braking.

11) It can be installed equally well with all different types of automobiles without any need for modifications.

The AKPS Principle

It is based on the same principle as that encountered in gardening. Imagine a garden hose, one meter long, connected to a faucet on one end. The other end is open and is lying on the ground. We now turn on the tap so that water flows out the other end. Now we close the tap. The water stops flowing. We then step on the hose and observe what happens at the open end. Each time we step on the hose, water squirts out the open end. We can repeat this as long as there is water in the hose. The pressure hoses (89, 90, 91) shown in the drawing are based on this principle.

Installation

The correct positioning of the RIGHT AND LEFT PANELS (13, 22) is the key factor affecting the entire performance and operating life of the AKPS. The design of the electrical power station is based on the principle of taking a few percentage points of kinetic energy from each vehicle. This energy is directly proportional to the vehicle's resistance.

The following rules must be observed in order to utilize this principle and not have a negative effect:

1) Installation: Only installed at locations where speed must be reduced—a) for safety reasons or b) when other situations require reduced speed, for example, on freeway exit ramps, on main thoroughfares, at intersections, in front of schools, business centers, or city centers, where the law stipulates that vehicle speed must be reduced, and in areas where special smog regulations apply.

2) On steeply inclined roads and highways. This means that vehicles traveling downhill have to reduce their speed for safety reasons.

3) Installation of the AKPS on other overpasses where speed has to be reduced.

The Function of the Roadway

Each vehicle should travel over the right-hand (R) and left-hand (L) S-panels (13, 22) located in the optimal path. We need to mark the given section of road, for example by means of visible lines. This method allows us to limit the path of the automobiles so that they do not travel on the sides.

Repairs

The greatest load on the entire circuit is essentially applied to the right and left S-panels (13, 22). Repairs should therefore merely involve easy panel replacement. Thus, the panels are designed to withstand such loads, and are constructed as simple, freely interconnectable parts, like those used in conveyor system vehicles.

The Function of the Automobile

Let us assume that the vehicle is traveling at velocity $v_1$ and has a kinetic energy of:

$$E_{k_1} = \frac{1}{2}mv_1^2$$

If the vehicle travels in a direction opposite to that of velocity $v_1$, and has the kinetic energy represented by the constant force F, R+L S-panel (13, 22), its speed will change to velocity $v_2$, and the kinetic energy will change to a value of $$E_{k_2} = \frac{1}{2}mv_2^2$$

Thus, the R+L S-panels (13, 22) perform mechanical work as a result of the force (F) acting upon them. This work corresponds to the change in kinetic energy:

$$E_{k_2} - E_{k_1} = \frac{1}{2}mv_2^2 - \frac{1}{2}mv_1^2 = \Delta E_K$$

The change in the kinetic energy of the vehicle, $\Delta E_K$, is equal to the mechanical work (W) and the applied force. It is:

$$\Delta E_k = W$$

If we also consider further that the vehicle wheels simultaneously produce a thrust motion and rotation, the kinetic energy becomes:

$$E_k = \frac{1}{2}mv^2 + \frac{1}{2}J\omega^2$$

Function

Figure 1:
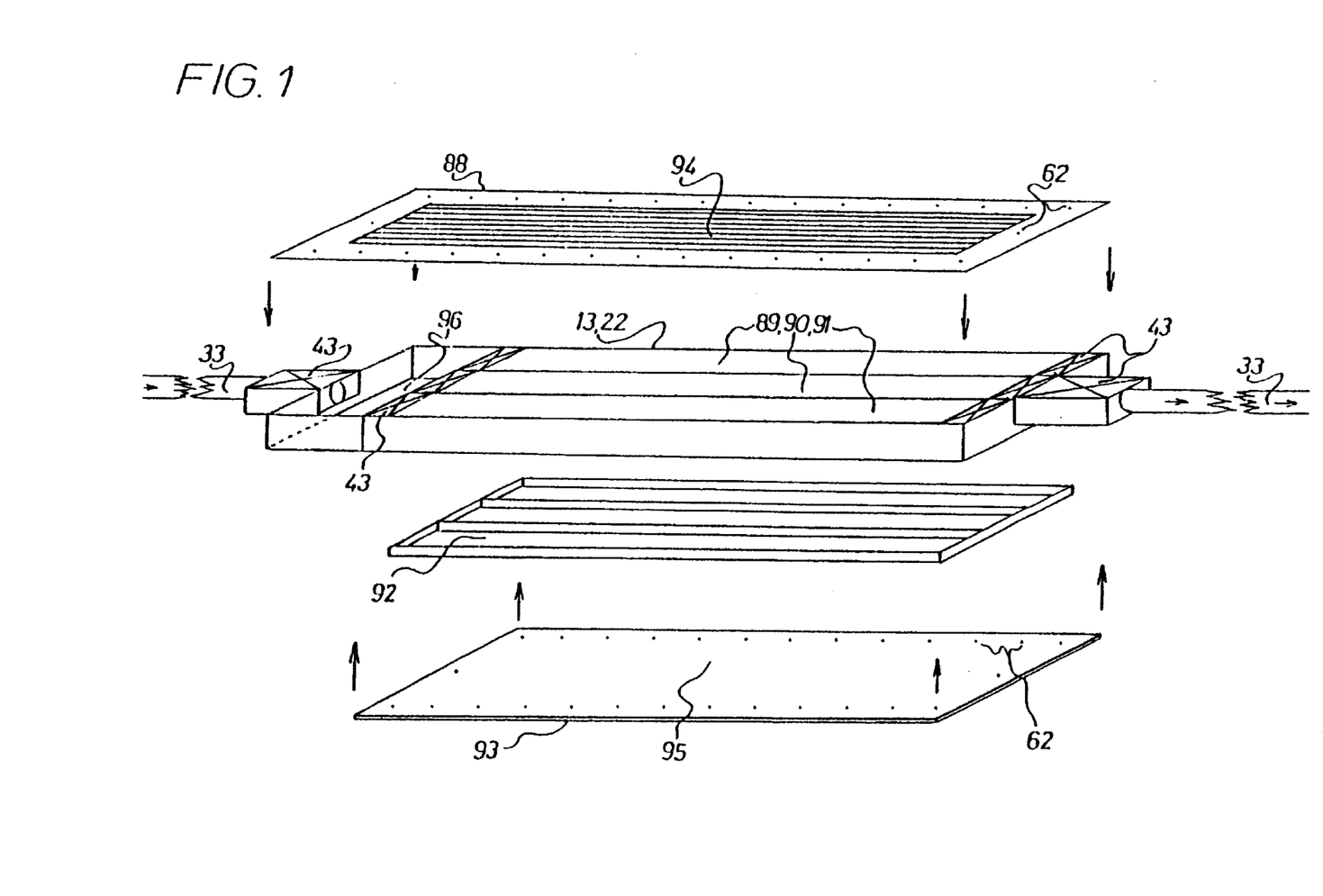
FIG. 1) All of the components comprising the R+L S-panels (13, 22) are shown in the figure. Pressure hoses (89, 90, 91) are shown in the horizontal direction.
Figure 2:
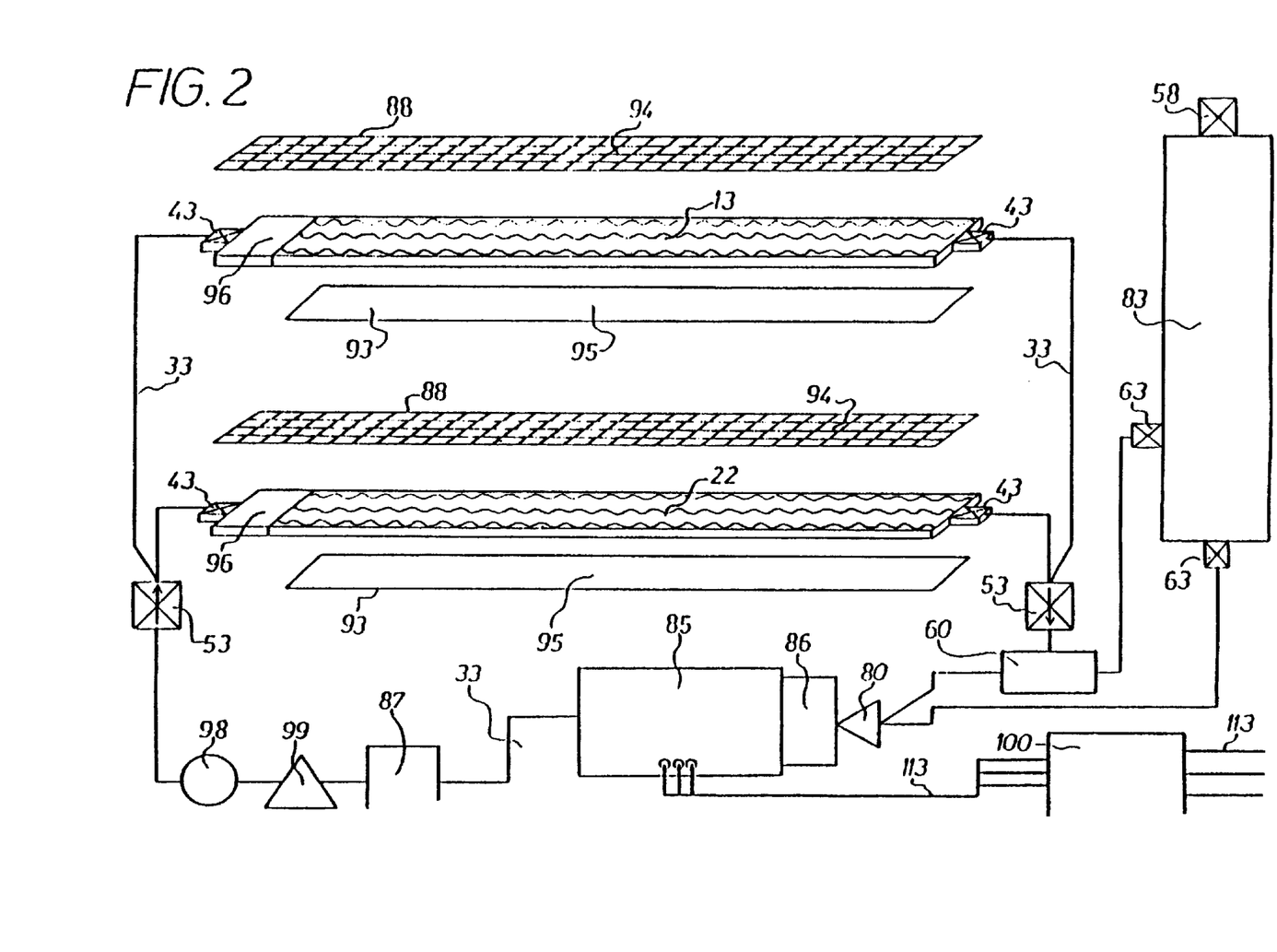
FIG. 2) Complete view of the main components comprising the AKPS.
Figure 3:
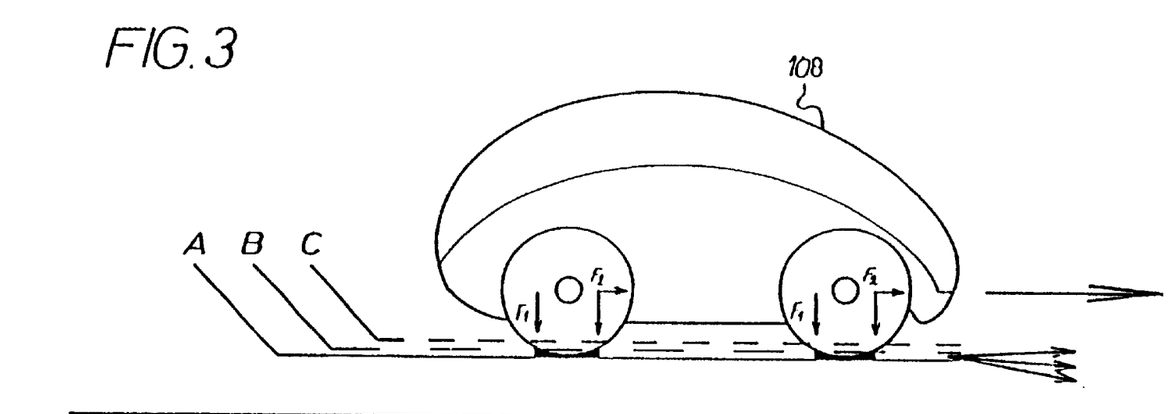
FIG. 3) Principle of routing the forces from the automobile FI and F2. They are applied to two types of pressure hoses, A, B and A, C, which are generally different. The surfaces under the automobile wheels that are filled in in black indicate the effect of the deformation of the pressure hoses that force the water out in the same direction at the end of the panel. T2 is a mechanical force from the automobile that acts in the same direction as the vehicle and is perpendicular to the force F1 from the automobile.
Figure 4:
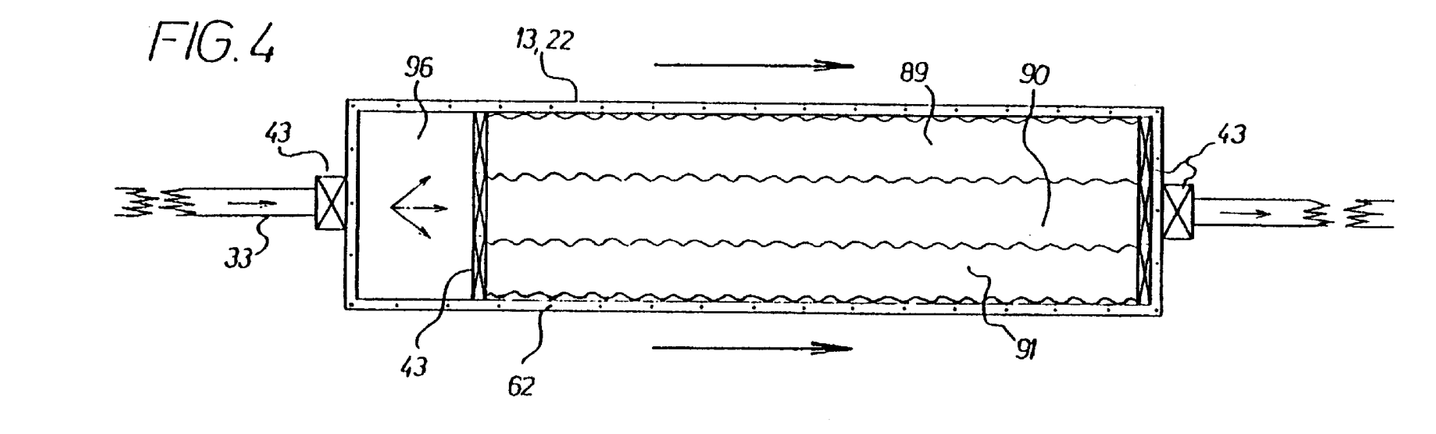
Figure 5:
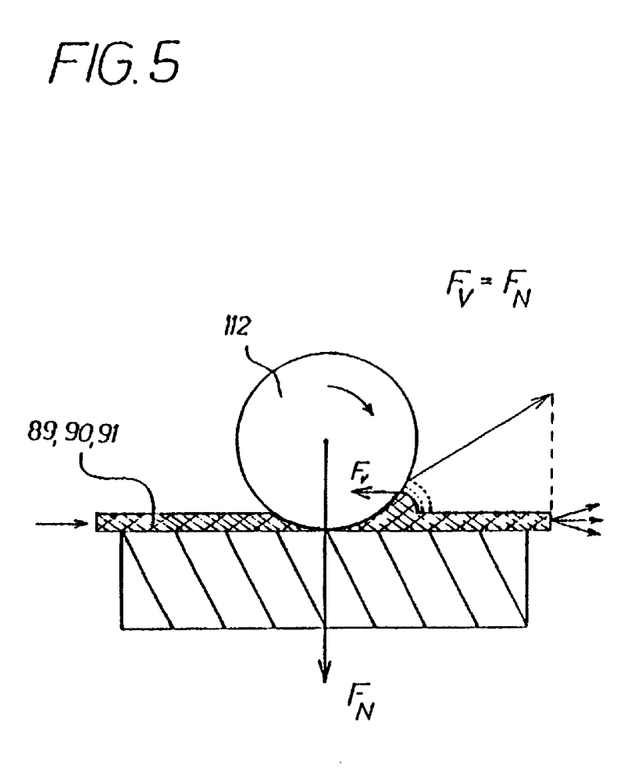
FIG. 5) Principle without cover sheet (88)
Figure 6:
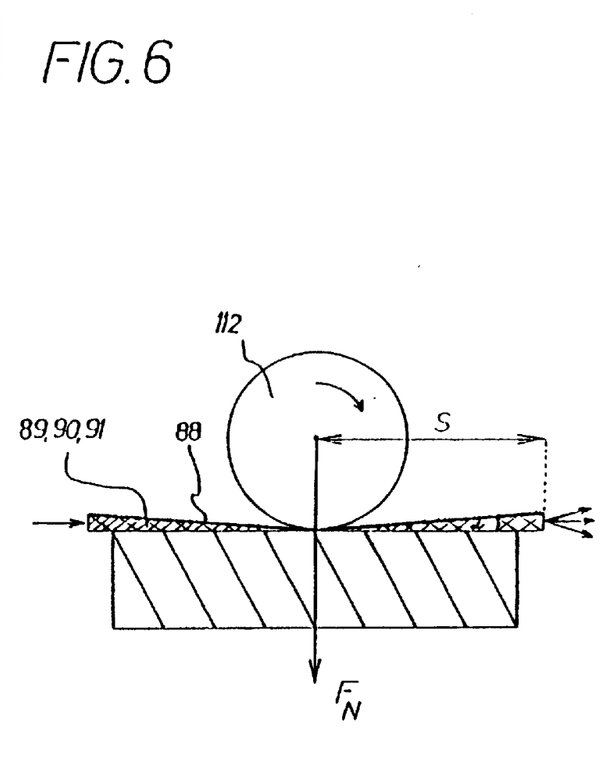
Figure 7:
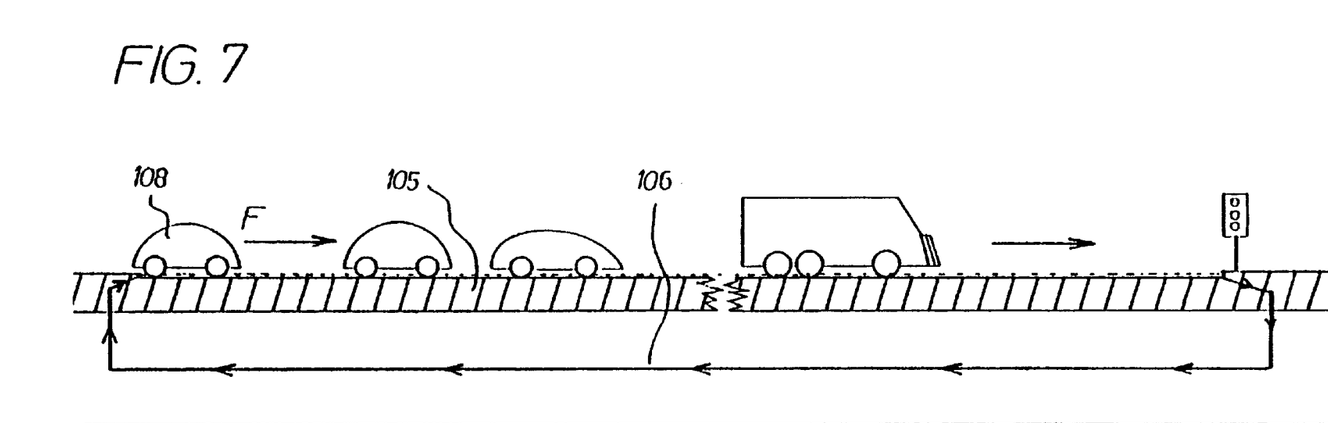
FIG. 7) Principle of the AKPS
Figure 8:
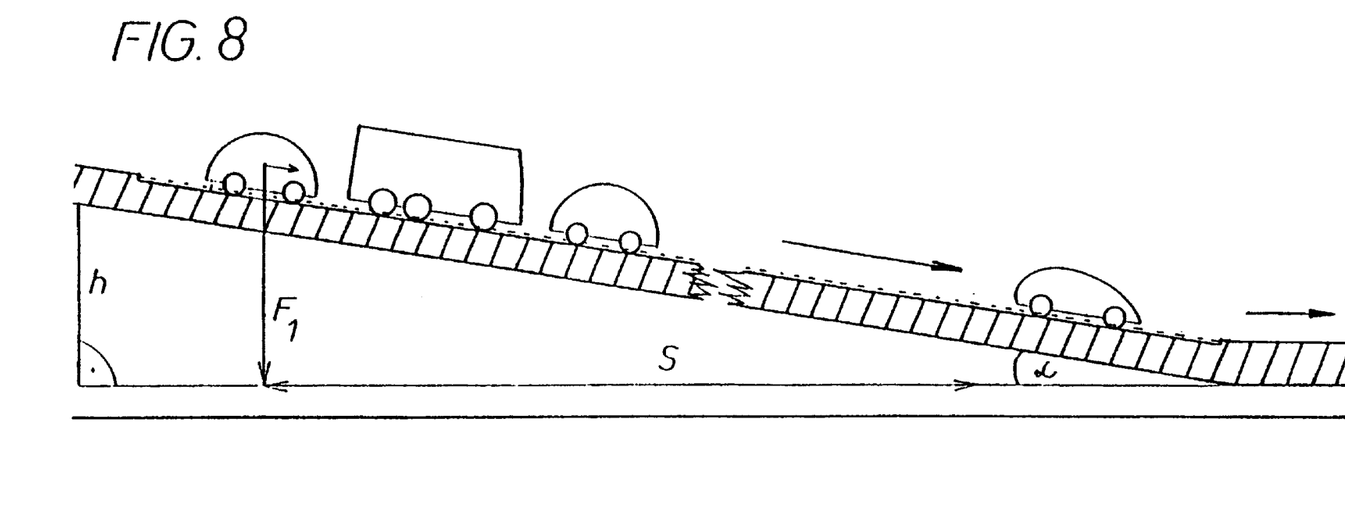
FIG. 8) This figure shows the location and activity of the AKPS on the plane of the plate, with a column of vehicles traveling in one direction downhill from left to right. They generate the electrical energy separately as a function of the compressive force $F_l$ of each vehicle.
Figure 9:
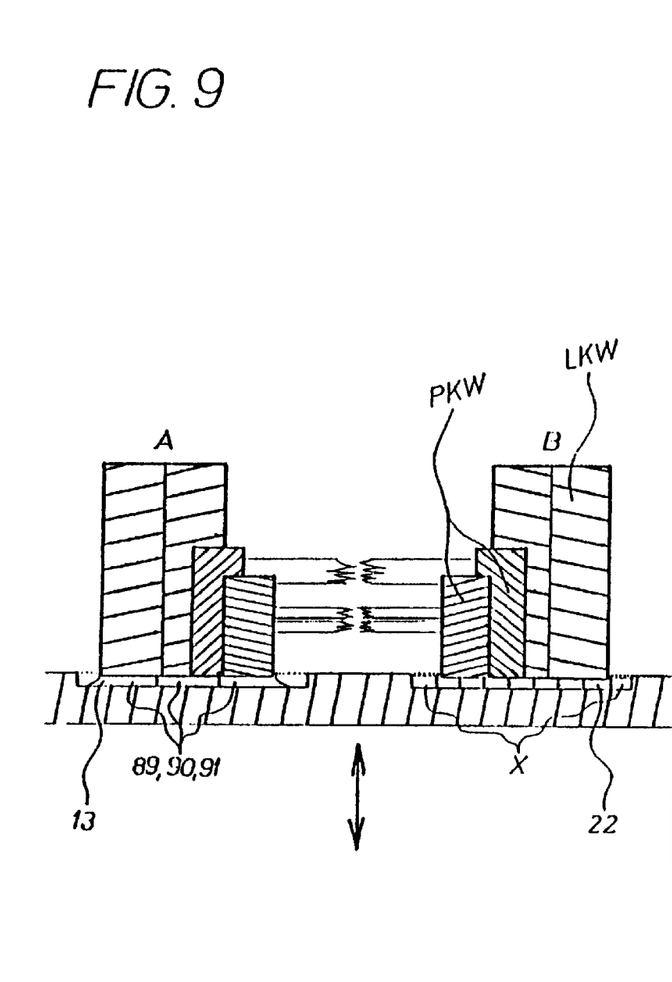
FIG. 9) This figure shows the position of the R+L S-panels (13, 22) in a sectional view through the road surface, which is divided into two parts, A and B.
Figure 10:
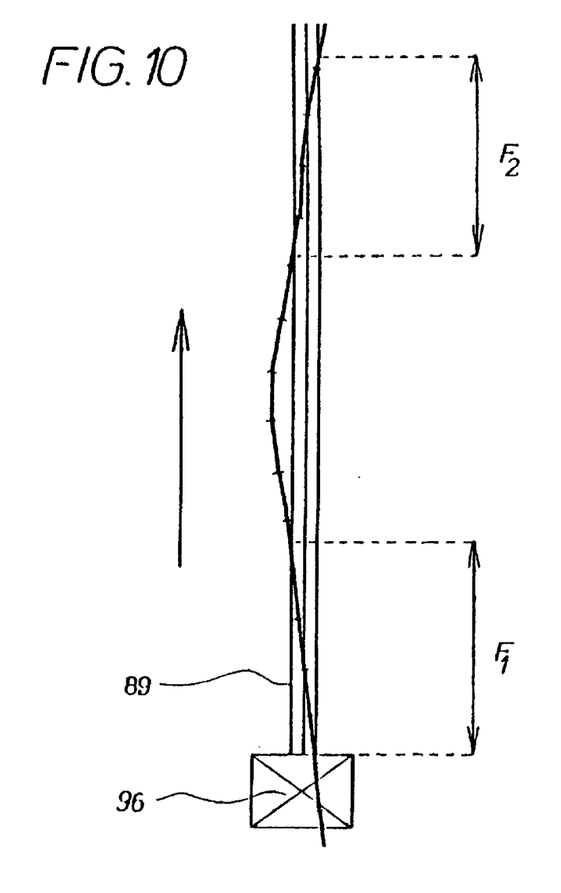

In the initial phase the wheels of each vehicle first travel over the PRESSURE CONTAINER (96), which is always resupplied with water (as can be seen in FIGS. 1 and 2) and which compensates for the decrease in the amount of water in the pressure hose. The vehicle wheels begin to travel over the RIGHT and LEFT S-PANELS (13, 22), on which the cover sheet (88) is installed. The purpose of this sheet is to reduce the resistance between the vehicle wheels and the PRESSURE HOSE (89, 90, 91). It also helps to prevent damage to the upper exterior side. (See the visible difference, FIGS. 5, 6). The PRESSURE HOSE is located along the entire length (89, 90, 91) of the interior of the RIGHT+LEFT S-PANELS (13, 22). The kinetic energy and the weight of the vehicle applied to the wheels forces the water into the pipe at high pressure.

The water pressure outside the PRESSURE HOSE (89, 90, 91) is positively transformed through the pipe's S-shaped position as well as in the semicircular curves that connect in series along the entire length of the pipes. This means that the kinetic energy of the vehicle acts in the same direction as that of its movement and that it results from its velocity and the weight of the vehicle, which is shorter than the pressure hose length (89, 90, 91). This pressure hose must be securely installed on the PANEL INSERT (92) so that it cannot move laterally when the vehicle passes over.

The PANEL INSERT (92) serves as a sealing and retaining cover for the PRESSURE HOSE (89, 90, 91). The RIGHT AND LEFT S-PANELS (13, 22) have a lower PLATE (93), which also has a smooth surface and which protects the PRESSURE HOSE (89, 90, 91) from damage.

Water pressurized in this manner passes is allowed to pass under high pressure via a SINGLE-PATH VALVE (43) in parallel into the PRESSURE HOSES (33) that lead out of the RIGHT AND LEFT S-PANELS (13, 22). The HOSES (33) are further connected to the CENTRAL VALVE (53) and from there on to the DISTRIBUTOR (60), where two basic versions, A and B, can be used.

A-VERSION: This is a two-position two-way distributor, which can perform the following:
 (a) When sufficient pressure is present, allow the liquids to flow unimpeded to the generator, and
 (b) when pressure is low, close off the fluctuating flow of liquid and to open the flow through the PRESSURE VESSEL VALVE (63) and from there on into the PRESSURE VESSEL (83).

This vessel allows water to flow into the HYDROELECTRIC GENERATOR (85) up to a set pressure limit. The pressure vessel is protected from excess pressure by means of a SAFETY VALVE (58). Since the containers are mass-produced, they must be built to withstand excess pressures in the flow through the generator.

B-version: Pressure source with a hydroelectric generator, which can be used for three different pressures. The maximum pressure is set at the pressure valve on the hydroelectric generator. The lower pressures are shunted incrementally through a DISTRIBUTOR (60) when the supply of pressure to the PRESSURE VESSEL (83) drops with the PRESSURE VESSEL VALVE (63).

Various types of DISTRIBUTORS (60) are used, depending on the design, power and degree of automation. The water passes through various processes under high pressure. In the final phase, the water passes through a DT/SE (80), which duplicates its pressure and transforms it to a maximum. The optimal position of the nozzle (80) also controls the water pressure, the maximum effect on the blades of the TURBINE (86), which is connected to the HYDROELECTRIC GENERATOR (85), from which the ELECTRICAL CURRENT is passed through a CABLE (113) to the TRANSFORMER (100). The water also passes through a CONTINUOUS FILTER (87), which keeps the liquid (water) in good operating condition in order to ensure that the entire system operates properly. The main requirement relating to the filter is that it must have a minimum pressure loss of one-tenth of the Mpa. The water then flows through the WATER PUMP (99), back through the AIR BLEEDER (98), through the CENTRAL VALVE (53), which distributes the water to the PIPES (33) on the RIGHT—LEFT S-PANELS and that close the electric power station loop.

Application of Fluid Mechanisms

The hydraulic and pneumatic mechanisms constitute an important part of the design. Their performance figures are increased significantly by integrating them with electronic control systems, thus increasing the productivity and reliability of the entire electrical power station. The effectiveness can be determined experimentally. Aside from easily measured parameters like pressure, flow, RPM, and torque, we always need to know the value of the geometric circuit. In the future, an auxiliary electrical power generator designed for very low and high pressures can be used in the area of the electrical power station.

Another important factor that we can use to affect the performance of the electrical power station is the direct dependency on the inlet valves, closing and reduction valves, and the control valves; also in the dependency on the hydraulic and reduction valves which are actuated mechanically or electrically, that we have to add to the scope of the station and in this way be able to design the electrical power stations for specific conditions.

The Future of AKPS

Figure 11:
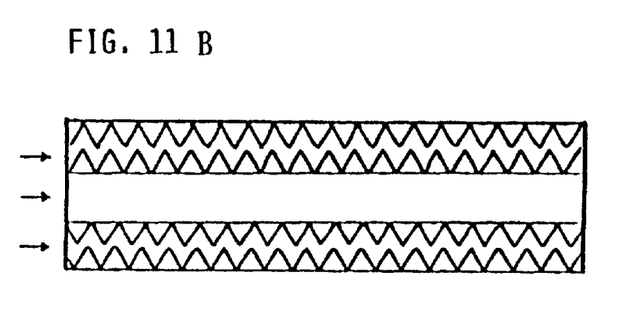

I believe that the advantage is improving the function of the pressure hoses as shown in FIGS. 11B and C. These are the wide-diameter main hoses, and weak only supplemental. Only the weak pressure hoses work in light traffic. The remaining pressure hoses are switched in when traffic is heavier. In maximum traffic, all the hoses are used, LEFT+RIGHT S-PANELS: As traffic decreases in the opposite direction, various pressure hoses are shut off with the aid of:
 A) the front-end section
 B) the computer, which on a downhill slope utilizes electrical, optical sensors. It is installed on the road surface.

DESCRIPTION OF THE FIGURES

FIG. 4) This figure shows the function of the cover sheet (88) on the R+L S-panels (13, 22). It plays an important role in reducing the resistance force Fv, which is shown progressively on the that does not have a pressure sheet (88). The pressure hoses (89, 90, 91) are clearly visible here. The arrows show the direction of motion (water flow) outside the panels.

The rotation motion of the automobile wheels on the unprotected pressure hoses (89, 90, 91) generates the resistance force Fv. This force acts as a braking force counter to the direction of motion of each vehicle wheel. The deformation of the pressure hoses is caused in this way when the compressed air $F_n$ is produced. The magnitude of the resistance force $F_v$ is uniformly the magnitude of the compressive force $F_n$ combined with the velocity of the vehicle. This clearly reveals the purpose and principle of the pressure sheet (88).

FIG. 6) Principle of the pressure sheet (88) This drawing shows the function of the pressure sheet on the R+L S-panels (13, 22). It is very important for reducing the resistance force $F_v$ that moves along progressively on the longer section (S). The same quality of the function of the pressure hoses (89, 90, 91) is present with the goal of having a low resistance force $F_v$, even at high vehicle speeds.

This figure shows the location and function of the electrical power station, where the column of vehicles (108) that already mechanical force F in the same direction need to brake at the same time at the approach to an intersection. The black line and arrows indicate the object (water regulation).

A) Here we see the right-hand S-panel (13), whose dimensions are universally appropriate to all types of vehicles (passenger and truck) standing on the pressure hoses (89, 90, 91). The front portion shows the direction of the vehicle offsets on both sides.

B) Sectional view through the left-hand S-panels (22), in which new pressure hoses (X) are installed. The are arranged so that they coincide completely with all groups (passenger vehicles, trucks). FIG. A+B only shows the principle of the AKPS operations.

FIG. 10) The thick line in this figure illustrates the principle of the movement of the automobile wheel in the direction indicated by the arrow. It first travels over the pressure container (96), where it forces the water into the pressure hoses (89). It then travels over the pressure hoses in sections FI and F2. This small section is completely sufficient to convert the small amount of electrical energy. The idea is that each vehicle must or may travel on exactly the same track from the beginning to the end of the right+left S-panel.

FIGS. 11A, 11B, 11C, 11D) Show the classical forms of mounting the pressure hoses in the S-panels (13, 22). The forms of the embodiments are shown here, as are the various pressure hose diameters. Each of these groups has its own specific performance characteristics. In this way we can differentiate between the various types of roadways in order to maximize the power station output.

FIG. 11D) The diameter of the pressure hoses in the S-panels decreases from the entry side to the exit side, resulting in an amplification of the pressure that can be used on the generator end.

The power station, as shown in FIG. 1, is based on the principle of a closed loop in the system of right and left S-panels (13, 22) from the ability to connect the panels in series or in parallel in the selected length and number. It does not limit the number or construction of the vehicles. It transforms the kinetic energy of the driver-controlled vehicles to electrical energy as they travel along the road.

The right and left S-panels (13, 22) are preferably installed in a line horizontal with the roadway in one direction.

In addition, pressure hoses (89, 90, 91) are preferably installed in the panels (13, 22). The kinetic energy and weight of the vehicle apply pressure to these hoses, forcing the water contained in the hoses in the direction in which the vehicle is traveling. The vehicle is shorter than the pressure hoses (89, 90, 91).

A cover sheet (88) can be attached to the surface of the right+left S-panels (13, 22) to protect the pressure hose (89, 90, 91). An anti-skid surface (94) is provided on the exterior side of the cover sheet (88).

In order to achieve more even water flow, a pressure container (96) can be installed ahead of the right+left S-panels. This permits water to enter the pressure hoses (89, 90, 91) through check valves (43).

A panel insert is preferably provided to serve as a sealing and retaining cover for the pressure hose. This cover can be secured on the lower surface by a lower plate. It preferably has a smooth surface (95) facing in the direction of the pressure hose.

| List of Reference Numbers: | | | |
|---|---|---|---|
| 13 | Right S Panel | 105 | Road |
| 22 | Left S Panel | 106 | Water circulation |
| 33 | Pipes | 108 | Vehicle |
| 43 | Inlet valve | 112 | Vehicle wheel |
| 53 | Central valve | 113 | Electrical cable |
| 58 | Safety valve | 60 | Distributor O |
| 62 | Mounting bolt | 63 | Pressure vessel valve |
| 80 | Nozzle | 83 | Pressure vessel |
| 85 | Hydroelectrical power generator | 86 | Turbine |
| 87 | Filter | 88 | Cover sheet |
| 89 | Pressure hose, right 4b | 90 | Pressure hose, center |
| 91 | Pressure hose, left | 92 | Pnael insert |
| 93 | Lower plate | 94 | Anti-skid surface |
| 95 | Smooth surface | 96 | Pressure container |
| 98 | Bleeder | 99 | Water pump |
| 100 | Transformer | | |

What is claimed is:

1. A device for generating electrical energy from kinetic energy of wheeled vehicles on a roadway, comprising
at least one fluid pressure vessel arranged in the roadway, said pressure vessel comprising at least one pressure chamber that is compressible substantially perpendicular to the roadway,
a flexible cover sheet over the pressure vessel for transmitting force from the wheels of vehicles on the roadway to the pressure chamber, the cover sheet having a non-slip surface,
at least one circuit for said fluid, said pressure chamber being a component of said fluid circuit, and
at least one turbine/generator unit that is disposed in the fluid circuit for generating electrical energy from the flow of the fluid, wherein said pressure vessel is configured as a chest that is elongated in the roadway direction and in the front and rear sides of which fluid circuit pipes are ported, wherein elongated pressure chambers are formed in said pressure vessel by partitions, said pressure chambers permitting fluid flow substantially only parallel to the longitudinal direction of said pressure vessel, and wherein the diameter of the pressure chambers is diminished from the front side to the rear side of said pressure vessel.

2. The device as set forth in claim 1, wherein the cover sheet forms the surface of the roadway.

3. The device as set forth in claim 1, wherein a distribution chamber is provided in the front side of said pressure vessel.

4. The device as set forth in claim 1, wherein at least one one-way valve is disposed in said circuit.

5. The device as set forth in claim 1, wherein a filter is disposed in said circuit.

6. The device as set forth in claim 1, wherein a pressure accumulator is disposed in said circuit.

7. The device as set forth in claim 1, wherein the pressure chambers of several pressure vessels are connectable in parallel or in series.

8. A device for generating electrical energy from kinetic energy of wheeled vehicles on a roadway, comprising:

at least one fluid pressure vessel arranged in the roadway, said pressure vessel comprising at least one pressure chamber that is compressible substantially perpendicular to the roadway, a flexible cover sheet over the pressure vessel for transmitting force from the wheels of vehicles on the roadway to the pressure chamber, the cover sheet having a non-slip surface, at least one circuit for said fluid, said pressure chamber being a component of said fluid circuit, and at least one turbine/generator unit that is disposed in the fluid circuit for generating electrical energy from the flow of the fluid, wherein said pressure vessel is configured as a chest that is elongated in the roadway direction and in the front and rear sides of which fluid circuit pipes are ported, and wherein for defining said pressure vessel a plate or slab securable to the roadway subcourse is provided, including an insert whose surface facing the pressure chambers is smooth.

9. A device for generating electrical energy from kinetic energy of wheeled vehicles on a roadway, comprising at least one fluid pressure vessel arranged in the roadway, said pressure vessel comprising at least one pressure chamber that is compressible substantially perpendicular to the roadway, at least one circuit for said fluid, said pressure chamber being a component of said fluid circuit, and at least one turbine/generator unit that is disposed in the fluid circuit for generating electrical energy from the flow of the fluid, wherein said pressure vessel is configured as a chest that is elongated in the roadway direction and in the front and rear sides of which fluid circuit pipes are ported, wherein elongated pressure chambers are formed in said pressure vessel by partitions, said pressure chambers permitting fluid flow substantially only parallel to the longitudinal direction of said pressure vessel, and wherein the diameter of said pressure chambers is diminished from the front side to the rear side of said pressure vessel.

10. A device for generating electrical energy from kinetic energy of wheeled vehicles on a roadway, comprising at least one fluid pressure vessel arranged in the roadway, said pressure vessel comprising at least one pressure chamber that is compressible substantially perpendicular to the roadway, at least one circuit for said fluid, said pressure chamber being a component of said fluid circuit, and at least one turbine/generator unit that is disposed in the fluid circuit for generating electrical energy from the flow of the fluid, wherein said pressure vessel is configured as a chest that is elongated in the roadway direction and in the front and rear sides of which fluid circuit pipes are ported, and wherein for defining said pressure vessel a plate or slab securable to the roadway subcourse is provided, including an insert whose surface facing said pressure chambers is smooth.

* * * * *